UNITED STATES PATENT OFFICE.

JAY W. BOTHWELL, OF DENVER, COLORADO.

METHOD AND PROCESS OF MAKING AND APPLYING DECORATIVE PAINT COLORS TO ARTICLES AND MATERIALS.

No. 846,774.  Specification of Letters Patent.  Patented March 12, 1907.

Application filed October 15, 1906. Serial No. 339,138.

*To all whom it may concern:*

Be it known that I, JAY W. BOTHWELL, a citizen of the United States of America, residing at the city and county of Denver and State of Colorado, have invented a new and useful Method and Process for Making and Applying Decorative Paint Colors to Articles and Materials, of which the following is a specification.

My invention relates to a new and improved mechanically-operating process and method for applying ornamental and decorative paint-pigment colors to fabric, paper, pottery, porcelain, and to articles of wood, metal, or any other material to which my solution will adhere; and the objects of my invention are, first, to provide a substantially instantaneous process of permanently coloring or painting articles of all kinds by surface contact of the article to be ornamented with my coloring solution; second, to provide a coloring solution or a plurality of coloring solutions and a method and process of applying the same which consists of a composition of ingredients and pigments compounded into a solution of any desired color or of any desired number of blended and variegated colors that will instantly spread itself as a film over the surface of a moving solution; third, to provide a process and apparatus for ornamentally coloring cloths, fabrics, paper, and all kinds of articles of various materials that will retain the colors, which consists in applying the same to the surface of my moving solution in a suitable tank and feeding onto the surface of the solution from suitable valve-controlled receptacles continuously and automatically, if desired or at the will of an operator, a supply of a coloring solution or of several different coloring solutions prepared from my flowing solution, and also of flowing onto the surface of said solution with said coloring solution or solutions a solution capable of setting, freezing, and of fixing into fixed ornamental patterns the inherent configuration or pattern the different coloring and other solutions may assume as they mingle together as they flow and spread out over the surface of the solution, and that will allow of the continuous formation of ornamental decorative paint-patterns of variegated colors, and of imparting these paint-patterns to continuously-feeding bolts or rolls of cloth, shelving, fabric, paper, and articles and objects of all kinds and materials. I accomplish these results by using any suitable fluid-holding receptacle.

In the practice of my process I first prepare the color solutions and use the following ingredients and mix them in the following manner: first, I take white enamel mixing or gold-sizing varnish of the lightest color and very best quality, with which I mix benzin in about equal parts. These ingredients are stirred thoroughly together and are preferably allowed to stand for a short period of time, preferably about forty-eight hours. At the end of this time I introduce into this solution of gold-sizing varnish and benzin, the paint pigment or pigments that are required to give the required color or colors to the ornamental decorative mixture, preferably mixing but one color of pigment with each gold-sizing varnish and benzin solution; but whenever it is desired to secure colors or shades of colors that require the mixing of more than one pigment I use as many more pigments than one as are required to give the desired color or shade of color. Consequently the pigment or pigments are thoroughly mixed and stirred into the gold-sizing varnish and benzin until the compound is of the consistency of thin flowing cream, when it becomes a compound solution of paint pigment or pigments, benzin, and gold-sizing varnish, which I term a "decorative pigment solution," and as soon as these ingredients are thoroughly mixed together it is ready for use; but I preferably allow it to stand for awhile before using it, as it is improved by age.

A number of these decorative pigment solutions of different colors and shades of colors are prepared and kept on hand for use in producing different ornamental and decorative paint patterns, which may be made up instantly for use in my decorative pigment solution-applying receptacle, which I will now describe. The remainder of the steps of my process are necessarily carried out in a suitable receptacle or tank, which is adapted to hold a body of the solution and which is arranged to support a number of receptacles of different decorative pigment solutions, as well as a plurality of receptacles of benzin and a receptacle for the setting or freezing solution. I do not illustrate these receptacles, as they consist of the commonest form of tanks or cans or pails, and in carrying out this feature of my process I proceed as follows:

This paint-film-supporting solution consists of water mixed with about one hundred parts of alcohol, which is fed continuously into the receptacle from a source of supply; but, if desired, water may be used for the paint-film-supporting solution instead of the solution of water and alcohol; but I preferably use the water and alcohol solution, and its surface simply acts as a supporting and distributing medium for the paint solutions. Upon the head end of the tank, and also on the opposite sides of the tank, I place the cans or pails or jars or barrels that hold the various paint-solution fluids that comprise the foundation step of my process. Thus on the head end of the tank I place a row of receptacles that hold different-colored pigment-paint solutions, compounded as above described, and on the opposite sides of the tank nearest to the pigment solutions I place receptacles that are provided with a supply of benzin and also a receptacle which holds the pigment film-setting solution, which consists of a mixture of two solutions, one solution of which consists of a solution of about ninety-five parts of alcohol and about five parts of shellac, and the other solution consists of a solution of equal parts of the solution just mentioned—that is, alcohol and shellac and benzin—and these two solutions are mixed together and form the setting solution.

All of the receptacles are provided with valve-controlled spigots which extend into the tank and discharge the solutions onto the body of the water and alcohol solution in the tank, except the film-setting solution, which is preferably sprayed onto the film of the paint solution. The next step of my process is, first, the formation of the variegated ornamental and decorative pigment solution film-pattern on the surface of the solution. This I accomplish as follows: Assuming that a pigment-pattern of several colors is desired, the spigots of several pigment-solution receptacles and also of the benzin receptacles are open enough to allow a small stream of the pigment solutions to flow onto the top of the moving body of water and alcohol solution, upon striking which it spreads almost instantaneously over the entire surface of the water, being aided thereby by the two opposite streams of benzin, which flow toward the center of the tank and mingle with the several different-colored pigment solutions, which also intermingle into innumerable intersticed relations with each other, which in an instant presents a pattern as large as the surface of the solution in the tank of the several intermingled colors of the pigment solutions.

In order to maintain the pattern thus obtained, it is necessary to set or freeze this film of intermingled pigment solution. This I accomplish by spraying over the surface of the film pattern the benzin and shellac solution, which contains the property of setting in a fixed body the variegated colored film as fast as it forms. The articles to be decoratively painted are then brought in contact with this fixed-pattern film at the head end of the tank, preferably by any suitable means, such as an endless belt arranged to support the articles. As the decorative-film pattern moves continuously, it should be continuously transferred to articles as fast as it is formed or it will run to waste. Thus, assuming that a roll of cloth or of paper is to be decoratively painted, it should be arranged to feed continuously in contact with the surface of the film. Thus a bolt of cloth can be mounted on a roll and feed around a roller mounted in the tank in a position to bring the under side of the cloth or paper in contact with the continuously-flowing paint film. The cloth can then be wound on a suitable roller placed far enough away from the tank to allow the paint to dry on the cloth.

Articles of pottery, ironware, wood, glass, and other material may be arranged on a traveling belt to be brought in contact with the film-pattern, and thus the painting of such articles may be made a continuous automatic operation the same as with rolls of cloth, fabrics, or paper. In like manner doors, window-frames, casings, moldings, wainscoting, panels, chairs, desks, and a great many articles can be fed continuously by mechanical means in contact with the pigment-solution film and be mechanically and automatically painted.

The best results are obtained by mechanically feeding articles in contact with the film just fast enough to take up or to allow the film to feed onto the article as fast and no faster than the continuously-feeding streams of different colored pigment solutions feed onto the solution in the tank. It is obvious that as many different colors of pigment solutions may be used as is desired in a pattern. Thus only one color may be used and articles may be automatically and mechanically painted with but one color, or, if desired, two or more colors may be intermingled into the commingling mixing patterns they assume.

Having described my method and process of painting articles, what I claim as new, and desire to secure by Letters Patent, is—

1. The process of mixing varnish, benzin, and paint pigment into a solution, and feeding the same onto the surface of a moving solution, in the presence of benzin, whereby a film of said pigment solution flows over the surface of said solution, then applying to said film of pigment solution a sprinkling of benzin and shellac to set the film so obtained into a fixed pattern, and then feeding material or articles in contact with said continuously-forming pigment-solution film.

2. A process of coating or painting materials and articles with decorative paint solutions, which consists in mixing paint solutions of varnish, benzin and any suitable paint pigment or pigments, to the consistency of a paint solution, then placing said solution or solutions in a suitable receptacle or receptacles, then feeding said solutions onto the surface of a body of flowing or still water, then flowing into said paint solution or solutions as they flow into and spread out into a film on the surface of said water a supply of benzin, then flowing onto and into said film of paint solutions and of benzin a solution of benzin and shellac, and then bringing the material or materials or the article or articles in contact with said film of combined paint solutions and benzin solution and benzin and shellac solutions.

3. A process of applying decorative paint colors to materials and articles of manufacture, which consists of first feeding paint solution or a plurality of different paint solutions and a suitable supply of benzin and a benzin, alcohol and shellac solution simultaneously, onto the surface of a slowly-moving body of any suitable fluid such as water or of a watery solution or of a solution of water, so as to form a film of paint solutions, on said body of fluid, then bringing said materials and articles to be decoratively painted in contact with said film of paint solutions.

In testimony whereof I affix my signature in presence of two witnesses.

JAY W. BOTHWELL.

Witnesses:
G. SARGENT ELLIOTT,
BESSIE THOMPSON.